United States Patent [19]

Kaatz

[11] Patent Number: 4,467,873

[45] Date of Patent: Aug. 28, 1984

[54] WEEDING TOOL FOR MOUNTING ON FINGERS OF USER'S HAND

[76] Inventor: Robert H. Kaatz, 6505 Parkwood Rd., Edina, Minn. 55436

[21] Appl. No.: 448,398

[22] Filed: Dec. 9, 1982

[51] Int. Cl.³ .............................................. A01B 1/16
[52] U.S. Cl. ...................................... 172/370; 30/298
[58] Field of Search ................ 172/370; 294/25, 26; 30/298; 2/21; 224/217

[56] References Cited

U.S. PATENT DOCUMENTS

| | | | |
|---|---|---|---|
| 384,635 | 6/1888 | Maynard | 172/370 |
| 909,018 | 1/1909 | Paxton | 172/370 |
| 1,265,296 | 5/1918 | Bossert et al. | 30/298 |
| 1,398,919 | 11/1921 | Schwarting | 30/298 |
| 1,400,414 | 12/1921 | Butler | 172/370 |
| 1,620,133 | 3/1927 | Randolph | 30/298 |
| 1,678,570 | 7/1928 | Longcor | 30/298 |
| 1,703,341 | 2/1929 | Halmet | 30/298 |
| 1,727,286 | 9/1929 | Hamre | 30/298 |
| 1,985,674 | 12/1934 | Bauer | 172/370 |
| 2,332,683 | 10/1943 | Aden | 30/298 |
| 2,409,101 | 10/1946 | Brittingham | 2/21 |
| 2,975,843 | 3/1961 | Lattin | 172/370 |
| 3,399,456 | 9/1968 | Johnson et al. | 294/25 X |
| 3,608,090 | 9/1971 | Wilson et al. | 2/21 |

*Primary Examiner*—Richard T. Stouffer
*Attorney, Agent, or Firm*—Vernon J. Pillote

[57] ABSTRACT

A weeding tool for mounting on the index and middle fingers of the user's hand. The tool comprises an elongated flexible band which is adjustable to form a loop of the size to encircle the first phalanges of the index and middle fingers of the user's hand, and a rigid probe mounted on a pad portion of the band to extend in a direction generally perpendicular to the plane of the loop formed by the band. A positioning rib is mounted on the pad portion to extend between the index and middle fingers of the user's hand and the probe is arranged to extend from the band and underlie the index finger on the hand for manipulation by the index finger or by the index finger and thumb.

13 Claims, 8 Drawing Figures

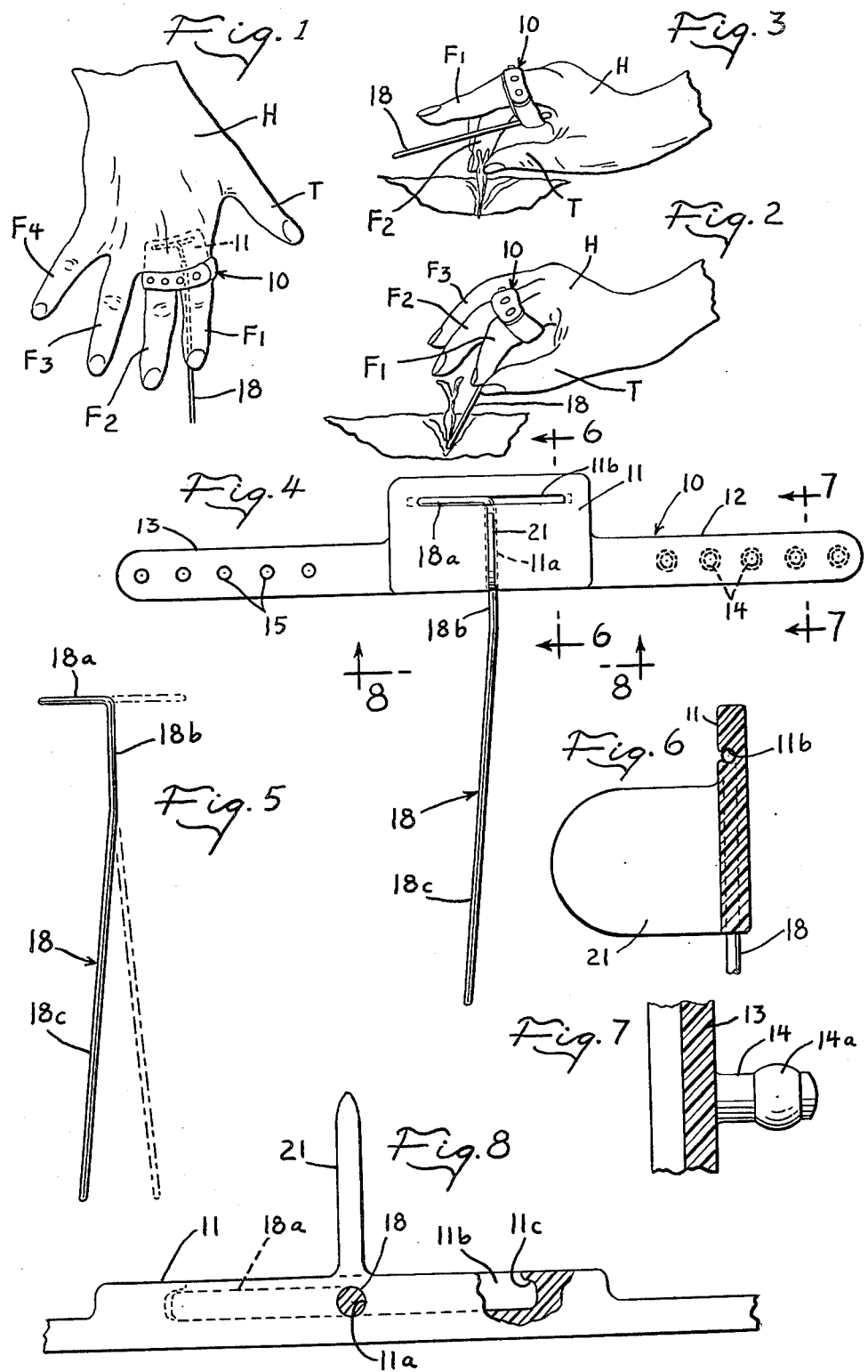

WEEDING TOOL FOR MOUNTING ON FINGERS OF USER'S HAND

BACKGROUND OF THE INVENTION

Various different hand weeding tools have heretofore been proposed for mounting on the hand of a user to facilitate weeding. Some weeding tools such as shown in U.S. Pat. Nos. 909,018; 1,985,674 and 2,975,843, are mounted on the user's hand above the fingers and can be manipulated during weeding only by wrist and arm movement. Further, the tool in U.S. Pat. No. 1,985,674 extends laterally from the palm side of the hand and would impede picking up objects with the user's fingers and opposing thumb. In U.S. Pat. No. 909,108 the tool is connected by a socket to the user's thumb and this would also impede picking up weeds with the fingers and opposing thumb. Some other weeding tools such as shown in U.S. Pat. Nos. 1,400,414 and 2,409,101 are mounted on the third phalanx of the thumb or one or more fingers of the user's hand. While these devices allow manipulation of the cultivating portion of the tool by movement of the fingers, as well as by wrist and arm movement, all forces both endwise and crosswise of the weeding tool, must be applied through the finger tips. The weeding tool in U.S. Pat. No. 384,635 is mounted by rigid rings on the first phalanges of the ring and little fingers of the user's hand and extends generally perpendicular to the outer side of the first phalanx of the little finger. Manipulation of the tool during weeding is limited to movement to the first phalanges of the ring and little fingers and by wrist and arm motion. Further, lateral forces on the tool would tend to cause the rigid rings to tilt or pivot crosswise of the first phalanges of the fingers and produce discomfort or possible injury to the fingers.

SUMMARY OF THE INVENTION

It is an object of the present invention to provide a weeding tool which mounts one end of a rigid probe on the first phalanges of the index and middle fingers of a users hand in such a manner that it can be readily manipulated either by pressing the end of the index finger against an intermediate portion of the probe or by grasping an intermediate portion of the probe between the tips of the index finger and thumb and manipulating the probe by wrist and arm motion for enhanced leverage, and which tool does not impede use of the other fingers and thumb of the user's hand to pick up loosened weeds and object.

Another object of this invention is to provide a weeding tool in accordance with the foregoing objects and which has improved arrangement for mounting the rigid probe on the mounting band.

Still another object of this invention is to provide a weeding tool which is adaptable for use on either left or right hand of a user.

Other objects of this invention are to provide a weeding tool which is economical to produce and comfortable in use.

These, together with other objects, features, and advantages of this invention will be more readily understood by reference to the following detailed description, when taken in connection with the accompanying drawings wherein:

FIG. 1 is a top view of a right hand showing the weeding tool mounted on the index and middle fingers the hand;

FIG. 2 is a side elevational view of a hand having a weeding tool mounted thereon and illustrating the use of the tool for loosening the root of a weed;

FIG. 3 is a side elevational view of a hand having the weeding tool mounted thereon and illustrating manipulation of the hand to pick up a loosened weed by its exposed root;

FIG. 4 is a plan view of the weeding tool;

FIG. 5 is a plan view of the probe, with an alternate position of the probe illustrated in phantom lines;

FIG. 6 is a transverse sectional view taken on the plane 6—6 of FIG. 4 illustrating the parts on a larger scale;

FIG. 7 is a transverse sectional view through the band taken on the plane 7—7 of FIG. 4 and illustrating parts on a larger scale; and FIG. 8 is a fragmentary sectional view taken on the plane 8—8 of FIG. 4 illustrating parts on a larger scale than FIG. 4.

The weeding tool is adapted to be mounted on the first phalanges of the index and middle fingers F1 and F2 of a users hand H. In general, the weeding tool includes an elongated flexible band 10 adapted to form a loop of a size to encircle the first phalanges of the index and middle fingers of the user's hand, and an elongated probe 18 that extends transverse to the loop and substantially beyond the tip of the index finger on the user's hand. In the embodiment illustrated, the probe extends forwardly about 7 cm. from the forward edge of the band. The band is formed of a rubber or resilient flexible plastic material, for example polyvinyl chloride, polyethylene or polypropelene, and has a pad portion 11 intermeidate its ends and strap portions 13 and 13 extending in opposite directions from the pad portion. The pad portion has a length, preferably in the order of 40 to 50 mm., to underlie the first phalanges of the index and middle fingers of the user's hand, and the strap portions 12 and 13 are adapted to be folded upwardly and inwardly into overlapping relation to form a loop that encircles the first phalanges of the index and middle fingers of the user's hand. The overall length of the band 10 is made somewhat greater than that necessary to encircle the index and middle fingers, for example of the order of 16 to 18 cm., and means are provided for adjustably interconnecting the ends of the band to adjust the size of the loop. In the embodiment shown, a row of pins 14 are formed on the outerside of the strap portion 12 at uniformly spaced locations therealong and a row of sockets or openings 15 are formed at corresponding uniformly spaced locations along the strap portion 13 to receive one or more of the pins 14 when the end portions of the strap are disposed in overlapping relation, for retaining the end portions of the strap in a loop. As best shown in FIG. 7, the pins 14 advantageously have an enlarged portion 14a intermediate their ends dimensioned in relation to the sockets 15 to allow the strap portion 13 to snap over the portions 14a for releasably retaining the strap portion 13 on the pins.

The pad portion 11 is preferably made somewhat thicker than the strap portions 12 and 13 for greater stiffness and support and the pad portion is also advantageously made wider than the sprap portion and arranged to extemd laterally from one side edge of the strap portion so as to underlie the palm portion of the user's hand in the area where the first and second phalanges are articulated to the metacarpal bones of the hand. The rigid probe 18 has one end mounted on the pad portion 11 and the probe extends substantially in the plane of the pad portion and in a direction generally perpendicular to the lengthwise dimension of the band to underlie the tip of the index finger on the user's hand. The probe 18 is conveniently formed of an elongated piece of rigid wire or rod, for example number 10 and 12 AWG steel wire, with a transverse portion 18a at one end. A passage 11a is formed in the pad portion intermediate the inner and outer side faces of the pad portion and extends in a direction perpendicular to the lengthwise dimension of the band. The passage 11a is dimensioned to allow insertion of the wire probe 18 therethrough and a transverse recess 11b is formed in one side face of the pad portion to intersect the passage 11a and to receive the transverse portion 18a on the probe. With this arrangement, the probe 18 can be inserted through the passage 11a in the pad portion and the transverse portion 18a on the probe therafter pressed into the recess 11b to hold the probe against axial and rotational movement. The recess 11b is preferable formed so that the opening at the side face of the pad is slightly narrower than the transverse portion 18a on the probe as shown in FIG. 6, and the ends of the transverse recess 11b are advantageously undercut as shown at 11c in FIG. 8, to releasably retain the transverse portion of the probe in the recess.

A band positioning rib 21 is provided on the pad portion and extends generally perpendicular to the inner side face of the pad portion and crosswise of the lengthwise dimension of the band to project between the index and second fingers of the user's hand when the band is mounted thereon. The band positioning rib positively locates and positions the band relative to the index and middle fingers of the user's hand, and the probe is attached to the pad portion at a location adjacent the postioning rib. Thus, the end of the probe that is attached to the mounting pad is located intermediate the index and middle fingers of the user's hand. The probe is angulated at a location outwardly of the pad portion so that the outer end of the probe underlies the tip of the index finger of the user's hand as shown in FIG. 1, when the weeding device is mounted on the index and middle fingers, so that the probe can be manipulated by pressing the tip of the index finger on an intermediate portion of the probe or by grasping an intermediate portion of the probe between the index finger and thumb as shown in FIG. 2, and manipulating probe tip with a wrist and or arm movement for enhanced leverage. Although the probe is mounted on the user's hand so as to underlie the tip of the index finger, it does not impede use of the thumb and the middle ring or little fingers of the user's hand for other operations. Thus, after the weed is loosened by the probe, the weed can be picked up between the thumb and middle finger of the user's hand as shown in FIG. 3.

The weeding tool is adapted for use on either the left or right hand of the user. The recess 11b in the pad portion and the transverse portion 18a on the probe are arranged to interfit in a first probe position shown in FIG. 4 and in solid lines in FIG. 5, and also in a second probe position in which the probe is turned about its lengthwise axis 180° from the first probe position, as shown in phantom in FIG. 5. The transverse portion 18a on the probe and the shank portions 18b and 18c of the probe are disposed in a common plane so that the portion 18c is disposed in a plane generally parallel to a plane through the side faces of the pad portion 11. However, the shank portion 18c is angulated relative to the shank portion 18b at a shallow angle, for example in the order of 5° to 7° so that the portion 18c will diverge at a shallow angle to the right side of a plane perpendicular to the length of the band, when the rod is in one position shown in solid lines in FIGS. 4 and 5, and the probe will diverge at a shallow angle to the left side of that plane when the probe is in its other position shown inphantom lines in FIG. 5. Thus, when the probe is positioned as shown in FIG. 4 and in solid lines in FIG. 5, the weeding device is adapted for mounting on the index and middle fingers of the left hand of the user and the shank portion 18c of the probe will underlie the index finger on the left hand. For right hand use, the probe is moved to its other position so that the shank portion 18c will underlie the index finger on the right hand of the user.

From the foregoing it is thought that the construction and use of the weeding tool will be readily understood. The weeding tool can be easily mounted on the index and middle fingers on the user's hand by positioning the pad portion at the underside of the first phalanges on the index and middle fingers, and then wrapping the end portions of the band around the fingers to form a loop which is interconnected by the pins and sockets 14 and 15. When the weeding divice is mounted on the user's hand, the positioning rib 21 extends between the index and middle fingers of the user's hand to locate the band and the probe extends forwardly from the pad in a plane generally paralleling the plane of the pad. The shank portion 18c of the probe in angulated slightly relative to a plane perpendicular to the length of the band so as to underlie the tip of the index finger on that hand. Thus, the probe can be manipulated to scarify, cultivate or dig by pressing the user's index finger downwardly on the shand portion 18c of the probe, or by grasping the shank portion 18c of the probe between the index finger and thumb as shown in FIG. 2 and moving the probe up, down or laterally with wrist and or arm movement. Although the probe underlies the index finger, the thumb and the middle, ring and little fingers of the user's hand remain free to perform other operations such as picking up loosened weeds or objects, as shown in FIG. 3.

The embodiments of the invention in which an exclusive property or privilege is claimed are defined as follows:

1. A weeding tool for mounting on the index and middle fingers of a user's hand comprising, an elongated flexible band having means for adjustably interconnecting its end portions to form a loop of a size adapted to encircle the first phalanges of the index and middle fingers of a user's hand, the band having a generally flat pad defining a plane, said pad being constructed of resilient flexible material with inner and outer side faces lying parallel to the plane of said pad, the pad having a first pad portion adapted to underlie the first phalanges of the index and middle fingers at their articulation with the metacarpal bones of the hand, the pad being substantially wider than the band and having a second pad portion extending laterally from one edge of the band a substantial distance so as to be adapted to underlie a portion of the user's palm under the knuckles of the user's hand, and an elongated rigid probe secured at one end to the second pad portion of the pad, the probe extending from said one end through the first pad portion intermediate its inner and outer side faces and forwardly a substantial distance from the first pad portion substantially in the plane of the pad and in a direction generally perpendicular to the lengthwise dimension of the band so as to be adapted to underlie and project beyond the tip of the index finger on the user's hand.

2. A weeding tool according to claim 1 including a band positioning rib on the inner side of the first pad portion disposed generally perpendicular thereto and crosswise of the lengthwise dimension of the band to project between the index and middle fingers on the user's hand.

3. A weeding tool according to claim 2 wherein the probe extends through the first pad portion at the location of the band positioning rib on the first pad portion.

4. A weeding tool for mounting on the index and middle fingers of a user's hand comprising, an elongated flexible band having means for adjustably interconnecting its end portions to form a loop of a size adapted to encircle the first phalanges of the index and middle fingers of the user's hand, the band having a generally flat pad portion with inner and outer side faces, the inner side face being adapted to underlie the first phalanges of the index and middle fingers at their articulation with the metacarpal bones of the hand, and an elongated rigid probe attached at one end to the pad portion of the band and extending forwardly from the pad portion substantially in the plane of the pad portion and in a direction generally perpendicular to the lengthwise dimension of the band so at to be adapted to underlie the tip of the index finger on the user's hand, the probe comprising an elongated wire rod having transverse portion at one end of the wire rod, the pad portion having a passage intermediate the inner and outer side faces thereof extending transverse to the plane of the loop formed by the band and dimensioned to allow axial insertion of said wire rod therethrough, the pad portion having a transverse recess in one of said faces intersecting said passage for receiving said transverse portion of the wire rod to hold the wire rod against axial movement in the passage.

5. A weeding tool according to claim 4 wherein said passage is at the location of said band positioning rib on the pad portion, said transverse recess in the pad portion and said transverse portion on the rod being constructed and arranged to interfit in a first rod position and in a second rod position in which the rod is turned about its lengthwise axis 180° from said first rod position, and said wire rod is angulated at a location outwardly of said passage in the pad portion to extend at a shallow acute angle to said passage.

6. A weeding tool according to claim 5 wherein said pad portion is wider than the remainder of the band and projects from the band in a direction opposite the probe.

7. A weeding tool according to claim 6 wherein said pad portion is formed integrally with said band intermediate the ends thereof.

8. A weeding tool for mounting on the index and middle fingers of a user's hand comprising, an elongated flexible band having means for adjustably interconnecting its end portions to form a loop of a size adapted to encircle the first phalanges of the index and middle fingers of a user's hand, an elongated wire rod having a transversely extending portion at one end, the band having a pad portion with inner and outer side faces and a passage intermediate the inner and outer side faces extending transverse to the lengthwise dimension of the band and dimensioned to allow axial insertion of the rod therethrough, the pad portion having a recess in one of said side faces intersecting said passage for receiving said transverse portion on the rod to hold the rod against axial movement in the passage, the rod extending from the pad portion in a direction generally parallel to the said side faces and transverse to the lengthwise dimension of the band.

9. A weeding tool according to claim 8 wherein said transverse recess in the pad portion and said transverse portion on the rod are constructed and arranged to interfit in a first rod position and in a second rod position in which the rod is turned about its lengthwise axis 180° from said first rod position, and said wire rod is angulated at a location outwardly of said passage in the pad portion to extend at a shallow acute angle to said passage.

10. A weeding tool according to claim 9 wherein said pad portion is wider than the band and projects laterally from the band in a direction opposite the probe.

11. A weeding tool according to claim 10 wherein said pad portion is thicker than the remainder of the band and is formed integrally therewith.

12. A weeding tool according to claim 9 including a band positioning rib on the inner side face of the pad portion extending transverse to the lengthwise dimension of the band for reception between the index and middle fingers on the user's hand.

13. A weeding tool according to claim 12 wherein said band positioning rib is disposed in a plane intersecting said passage in the pad portion.

* * * * *